United States Patent Office 2,969,366
Patented Jan. 24, 1961

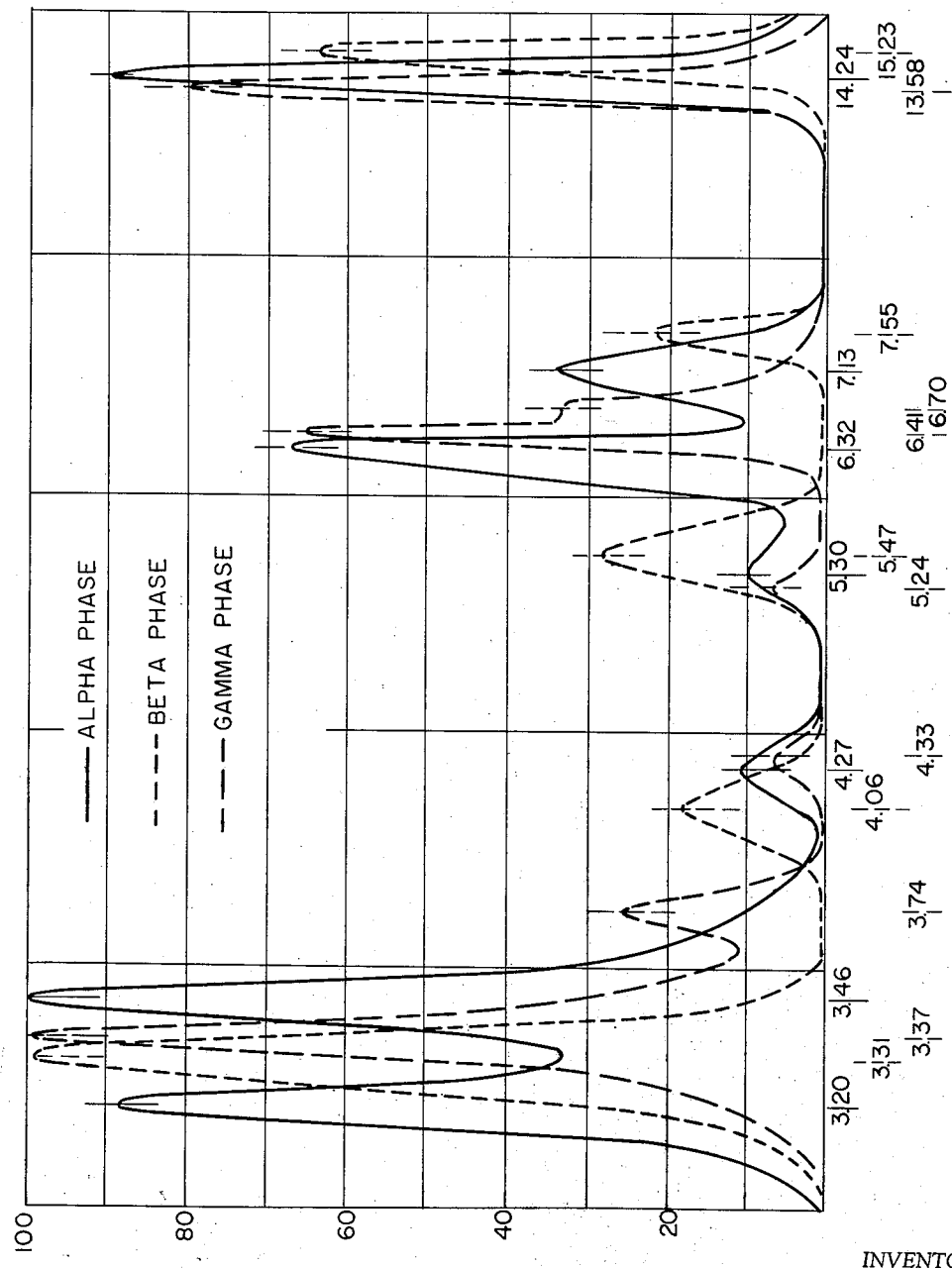

2,969,366

PRODUCTION OF QUINACRIDONES

Paul H. Griswold, Chatham, Felix Frederick Ehrich, Westfield, and William S. Struve, Chatham, N.J., assignors to E. I. du Pont de Nemours and Company, Wilmington, Del., a corporation of Delaware Filed Feb. 11, 1958, Ser. No. 714,550

15 Claims. (Cl. 260—279)

This invention relates to the manufacture of quinacridone and more particularly, it relates to means for controlling the process of oxidizing dihydroquinacridone to quinacridone so that this end product can be obtained in a desired crystal phase.

Linear quinacridone, which is also referred to as quin (2,3-b)acridine-7,14(5,12)-dione, has the following structural formula:

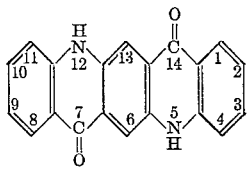

It has recently been found that this compound may exist in three different crystal phases, each exhibiting its own characteristics as to color, stability, and X-ray diffraction pattern. These crystal phases are referred to as the alpha crystal phase, the beta crystal phase, and the gamma crystal phase, and they are the subject matter of U.S. Patents 2,844,484, 2,844,485, and 2,844,581 respectively.

The accompanying drawing shows the X-ray diffraction patterns of the alpha, beta and gamma crystal phases of quinacridone with the intensities adjusted so that the most intense band of each pattern is assigned a value of 100 and the patterns are then superimposed in one drawing. These X-ray patterns were obtained by the well-known powder technique using a Geiger counter to record the intensity of the diffracted rays. The instrument actually records the intensity of the diffracted ray on the vertical axis versus the angle of diffraction on the horizontal axis with CuK alpha radiation, and then this angle is converted to interplanar spacings expressed in Angstrom units. The values given are accurate to within 2% and in most cases, variation is less than 1%. Therefore, cognizance should be taken of this variance when interpreting the specification and the claims. It is obvious that these patterns have certain similarities and this is natural because of the chemical identity of the phases. Nevertheless, there are characteristic differences.

The alpha phase in small particle size is characterized by two intense lines quite close together with interplanar spacings of 3.46 A. and 3.20 A., a third line of similar intensity with an interplanar spacing of 14.24 A., two lines of moderate intensity with interplanar spacings of 6.32 A. and 7.13 A., and two weak lines with interplanar spacings of 5.30 A. and 427 A. In hue, this product is a bluish red pigment of excellent strength and intensity The beta phase is characterized by five well-defined lines corresponding to interplanar spacings of 15.23 A., 7.55 A., 5.47 A., 406 A. and 331 A. The lines with interplanar spacings of 15.23 A. and 331 A. are characteristically much stronger than the other three. This product is a violet pigment of excellent intensity and strength, exhibiting a high degree of resistance to change under various conditions. It is a valuable pigment in its own right and also as a blending agent for use with blue pigments to obtain reddish blues.

The gamma phase is characterized by three strong lines with interplanar spacings of 13.58 A., 6.41 A. and 3.37 A. and four relatively weaker lines having interplanar spacings of 6.70 A., 5.24 A., 4.33 A. and 3.74 A. The line with the interplanar spacing of 6.70 A. characteristically appears, in the small particle size pigmentary products, as a hump on the side of the characteristically stronger line with the interplanar spacing of 6.41 A. However, in the larger particle size, and generally more crystalline products, this line may appear as a separate peak which approaches the intensity of the 6.41 A. line. In fact, the association of these two lines is one of the most characteristic factors in the X-ray patterns of the gamma crystal phase quinacridone. This product is a bluish red pigment of good tinctorial strength and excellent intensity of color and it exhibits outstanding resistance to change either on exposure to the elements, to solvents, or to chemical reagents. It is stable to heat up to about 400° C. and to the influence of many organic solvents which have been found to cause crystal growth accompanied by phase changes with other forms of quinacridone pigments.

Linear quinacridone may be prepared by heating a dialkyl 2,5-diaryl amino-3,6-dihydro terephthalate containing from 1–3 carbon atoms in the alkyl group in an inert, high boiling liquid or heat transfer medium such as a eutectic mixture of biphenyl and diphenyl oxide. This heating cyclizes the dialkyl 2,5-diarylamino-3,6-dihydro terephthalate to 6,13-dihydroquinacridone (more simply referred to herein as dihydroquinacridone), and this latter compound is oxidized to quinacridone with a mild oxidizing agent in the presence of an alkali-solvent-water medium. These reactions may be illustrated as follows:

Cyclization:

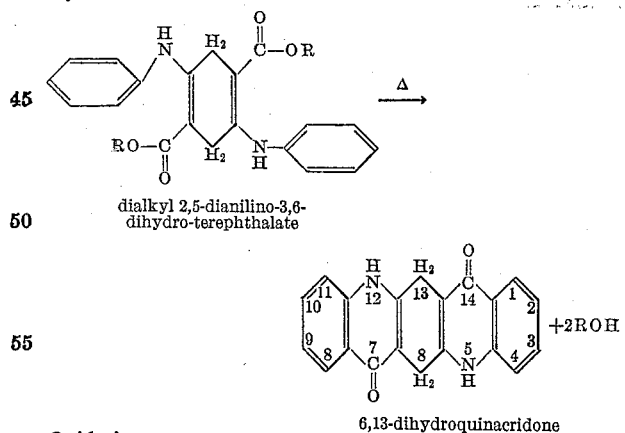

Oxidation:

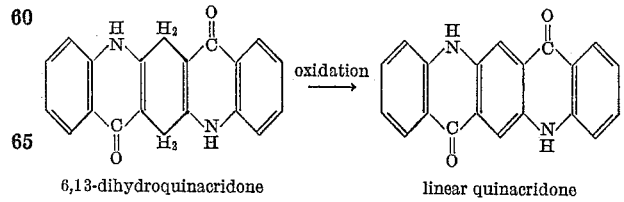

6,13-dihydroquinacridone            linear quinacridone

The cyclization and oxidation reactions illustrated above are described and claimed in U.S. Patent 2,821,529. The present invention is an improvement upon the process described in this application since it has been found that within the broad concept of oxidizing dihydroquinacridone to quinacridone, as described in said application, one may adjust the concentration of the alkali-solvent-water media, in which the oxidation may be carried out, for the purpose of obtaining quinacridone in either the beta or the gamma crystal phase.

It is therefore an object of this invention to oxidize dihydroquinacridone to quinacridone in a reaction medium of such nature that either beta or gamma crystal phase of the quinacridone may be obtained at will. It is another object of this invention to produce a quinacridone end product which is predominately in the beta crystal phase as determined by its X-ray diffraction pattern. It is a still further object of this invention to produce a quinacridone end product which is predominately in the gamma crystal phase as determined by its X-ray diffraction pattern.

The objects of this invention are accomplished by oxidizing 6,13-dihydroquinacridone to quinacridone with a mild oxidizing agent while partially suspended in and partially dissolved in a mixture of water, a strong alkali, and a polar, water-soluble solvent which is stable to strong aqueous alkali solutions.

The preferred method for converting dihydroquinacridone to quinacridone in U.S. Patent 2,821,529 is by oxidizing the former with a mild oxidizing agent, such as nitrobenzene-m-sodium sulfonate or sodium polysulfide, while in the presence of a mixture of alkali, water, and a polar water-soluble solvent, such as a lower alkanol. If the crystal phase of the quinacridone obtained is not important, the proportions of alkali, water and solvent in the oxidizing environment are not especially critical. On the other hand, it has been found that the relative amounts of the three components constituting the oxidizing environment have a profound influence on the crystal phase of the quinacridone end product. In the present invention, the concentrations of alkali and solvent in the water are suitably adjusted to exert an appreciable solvent action on the dihydroquinacridone being oxidized. The limiting concentrations within which the desired solvent action is brought about are set forth more fully below. By suitably adjusting concentrations according to this invention, the end product may be, predominately, either the beta crystal phase or the gamma crystal phase of quinacridone as determined by the X-ray diffraction pattern. Although dihydroquinacridone may exist in two crystal phases (alpha and beta), the physical structure of the dihydroquinacridone used in this invention does not influence the crystal phase of the quinacridone obtained. This is because the nature of a product in solution is quite independent of its physical characteristics in the solid crystalline form.

In a more specific embodiment of this invention, the amounts of ingredients in the oxidizing mixture may be 20–120 parts of alkali per 100 parts of water and at least 5 parts of alkali per 100 parts of total liquid used, the amount of organic solvent being at least as much as the water. Unless otherwise stated, amounts are specified herein on a weight basis.

The critical factor in producing a specific crystal phase of quinacridone according to this invention appears to be the rate at which thermodynamic equilibrium is established between the quinacridone in solution as its alkali metal salt (e.g., as its disodium salt) and the solid in suspension in this solution. The available facts now lead to the conclusion that gamma phase quinacridone is the most stable of the crystal phases of quinacridone, with the beta phase being next in order of stability. Therefore, the gamma phase should always result when thermodynamic equilibrium with the solution can be reached at a reasonable rate. Under conditions of lesser solubility of dihydroquinacridone as its disodium salt, the solid which precipitates from the oxidation mixture is beta crystal phase quinacridone. Under such conditions the solubility of the quinacridone as its disodium salt is so low that further transformation of the solid to achieve thermodynamic equilibrium and produce the gamma crystal phase is very slow and for all practical purposes does not occur.

If increased solubility is obtained by the addition of more alkali to the oxidizing environment, a point is reached at which the solid precipitated is disodium quinacridone which appears to readily reach equilibrium with the disodium quinacridone in solution. Since solid disodium quinacridone is not the desired product, the mixture must be diluted rapidly with water to hydrolyze the solid to quinacridone. As a result, the beta phase quinacridone is formed since the solubility becomes so low that further transformation to the more stable gamma phase is prevented.

As previously mentioned, the present invention is concerned with conducting the oxidation of 6,13-dihydroquinacridone in an oxidizing environment which exerts some solvent action on dihydroquinacridone. This type of oxidation may be referred to as a "solution oxidation." In contrast to the present invention, the concentration of the alkali-water-solvent mixture can be adjusted so that it exerts no significant solvent action on the dihydroquinacridone. This minimum solubility can be obtained by keeping the water content of the mixture high or the alkali content low (preferably both). Oxidation under conditions of minimum solubility may be referred to as a "solid state oxidation." Examination under the microscope indicates that particle size and shape do not change significantly during a solid state oxidation, the only observable difference being a change in color as the colored quinacridone product develops. Alpha crystal phase dihydroquinacridone produces alpha crystal phase quinacridone in a solid state oxidation and beta phase dihydroquinacridone produces gamma crystal phase quinacridone in such an oxidation. This discussion of "solid state oxidation" is presented so that one may understand the distinction between this type of oxidation and the "solution oxidation" of the present invention.

Table I which follows sets forth a range of amounts and also specific amounts for the mixture of alkali, water and solvent used as the oxidizing environment. By proceeding according to this table, one can control the crystal phase of the quinacridone end product.

TABLE I

| | Alkali (e.g., NaOH) | Water | Solvent | Percent of Alkali Based on Total Liquid |
|---|---|---|---|---|
| Beta crystal phase: | | | | |
| range | 20–35 | 100 | 100–200 | } 13 |
| preferred | 30 | 100 | 130 | |
| Beta (via formation of disodium quinacridone and hydrolysis to quinacridone): | | | | |
| range | 40–120 | 100 | >200 | } 29.5 |
| preferred | 100 | 100 | 240 | |
| Gamma crystal phase | | | alcohol+pyridine [1] | |
| range | 20–35 | 100 | 0–150+100–200=100–350 | } 7.5 |
| preferred | 30 | 100 | 150+150=300 | |

[1] A mixture of alcohol and pyridine is preferred to produce the gamma crystal phase. The alcohol may be either a mono or a dihydroxy alcohol. The organic solvent should be at least half pyridine and total solvent should be at least as much as the amount of water.

For a clearer understanding of the invention, the following specific examples are given. These examples are intended to be merely illustrative of the invention and not in limitation thereof.

*Example I.—Solution oxidation to gamma crystal phase by providing an oxidizing medium having sufficient solvent action to allow thermodynamic equilibrium to be reached.*

A mixture of 100 parts of 6,13-dihydroquinacridone (prepared in accordance with Example I of U.S. Patent 2,821,529), 640 parts of water, 770 parts of ethylene glycol, 200 parts of sodium hydroxide and 1,175 parts of pyridine is thoroughly stirred. 200 parts of nitrobenzene-m-sodium sulfonate is then added. The mixture is heated to the boil and stirred under reflux for about 2 hours, diluted with cold water, filtered, washed free of soluble salts and dried to give gamma crystal phase quinacridone which is a bright red powder. The X-ray diffraction pattern of the product exhibits three strong lines corresponding to interplanar spacings of 13.58 A., 6.41 A. and 3.37 A. and four weaker lines corresponding to interplanar spacings of 6.70 A., 5.24 A., 4.33 A. and 3.74 A. In the accompanying drawing this diffraction pattern is shown as the broken line.

Methanol or other water-soluble alcohols may replace the ethylene glycol in this example. Also, substantially equivalent production of gamma phase quinacridone results using the following ingredients in the same process:

100—6,13-dihydroquinacridone
640—water
200—sodium hydroxide
1200—pyridine
75—nitrobenzene-m-sodium sulfonate.

*Example II.—Solution oxidation of beta phase quinacridone by providing an oxidizing medium having insufficient solvent action to allow thermodynamic equilibrium to be reached*

100 parts of 6,13-dihydroquinacridone, 800 parts of methanol, 600 parts of water, and 200 parts of sodium hydroxide are added to a flask equipped with an agitator and a reflux condenser. The charge is stirred for about 15 minutes until the solid is thoroughly wet up by the liquid. 75 parts of nitrobenzene-m-sodium sulfonate is then added to the mixture which is then heated to the boil, and heating is continued under reflux for about 2 hours. A deep bluish red slurry results. This slurry is diluted with cold water, filtered, washed and dried to give beta crystal phase quinacridone which is a deep bluish red solid. The X-ray diffraction pattern of the product exhibits two strong lines corresponding to interplanar spacings of 15.23 A. and 3.31 A. and three other lines of lesser intensity corresponding to interplanar spacings of 7.55 A., 5.47 A. and 4.06 A. This pattern is illustrated in the accompanying drawing by the dotted line.

*Example III.—Solution oxidation to beta crystal phase via formation of disodium quinacridone and hydrolysis to quinacridone*

100 parts of 6,13-dihydroquinacridone, 600 parts of water, 1,440 parts of denatured ethanol (denatured with 5% methanol) and 640 parts of sodium hydroxide are added to a flask equipped with an agitator and a reflux condenser. The charge is stirred until the solid is completely wet up with the solution. 75 parts of nitrobenzene-m-sodium sulfonate is then added and the mixture is heated to the boil and stirred under reflux for about 4 hours. At this point, it is apparent that there is a substantial solubility of the solid in the liquid, for the liquid is shown to exhibit a strong bluish colored bleed, and there is little evidence of a red solid in the slurry. However, on the addition of about 5,000 parts of water to the slurry, the bleed completely disappears and beta crystal phase quinacridone precipitates as a deep bluish red solid.

If the following mixtures of ingredients are used as the oxidizing environment and the procedure of this example followed, beta phase quinacridone will be obtained regardless of the phase of the starting dihydroquinacridone.

|  | "Cellosolve" | n-Propanol | Ethanol Amine |
|---|---|---|---|
| dihydroquinacridone | 100 | 100 | 100 |
| water | 600 | 200 | 640 |
| sodium hydroxide | 640 | 200 | 200 |
| solvent | 1,675 | 1,440 | 1,220 |

It has been explained above that the control of crystal phase during the oxidation step is a function of the solubility of the various components in the liquid mixture and the rate at which equilibrium is obtained as the result of this solubility. When the solvent action of the liquid mixture is relatively high, thermodynamic equilibrium can be obtained within practical time limits, and the product formed is the most stable crystal phase of quinacridone, the gamma crystal phase. Although it is most practical to produce the gamma phase by allowing equilibrium to be attained during the oxidation step, it is also possible to produce a less stable crystal phase and then digest this phase in a suitable alkali-water-solvent mixture of sufficient solvent power to achieve thermodynamic equilibrium and produce the gamma crystal phase. For example, gamma crystal phase quinacridone can be obtained by refluxing 100 parts of beta phase quinacridone for about 2 hours in a mixture comprising 200 parts sodium hydroxide, 640 parts of water, 630 parts of ethylene glycol, and 1220 parts of pyridine.

The gamma crystal phase can also be obtained by seeding, prior to oxidation, an oxidizing mixture which would normally be expected to produce the beta crystal phase. The seeding with the gamma phase crystals causes this latter phase to grow preferentially, and thus promotes the obtainment of thermodynamic equilibrium. For instance, if 10 parts of an aqueous paste (25% solids) of gamma phase quinacridone is added to a mixture of 100 parts of dihydroquinacridone, 800 parts of methanol, 660 parts of water, and 200 parts of sodium hydroxide, and then refluxed for about 5 hours with 75 parts of nitrobenzene-m-sodium sulfonate, a gamma crystal phase product is obtained.

The solvent liquids used in the oxidation environment are water-soluble polar liquids which are stable in the presence of strong alkali. The following are illustrative of such liquids: water soluble alcoholic compounds including methanol, ethanol, n-propanol, isopropanol, isobutanol, glycerol, ethylene glycol and its monoalkyl ethers such as, monomethyl ether of ethylene glycol (methyl "Cellosolve"), monoethyl ether of ethylene glycol ("Cellosolve"), as well as ethanolamine, dioxan, ethylene diamine, pyridine, dimethyl sulfoxide, and mixtures of these liquids.

Pyridine is necessary in promoting the solution oxidation to gamma crystal phase quinacridone as exemplified by the use of pyridine in Example I. This solvent increases the solubility of the dihydroquinacridone and of the sodium quinacridone in the mixture without the necessity of increasing the alkali to the point where the sodium salt of quinacridone is precipitated. The latter phenomenon occurs when the alkali concentration is high. See Example III.

It is contemplated that any strong, water-soluble alkali is useful in this process but, for reasons of practical availability and cost, sodium hydroxide is much the preferred alkali. Nevertheless, potassium hydroxide, lithium hydroxide, barium hydroxide, and mixtures of such alkalis can be used successfully in the process.

The examples show the use of nitrobenzene-m-sodium sulfonate as the agent for oxidizing beta crystal phase dihydroquinacridone to gamma phase quinacridone. Sodium polysulfide is another oxidizing agent which can be used in this operation, and it is known that air will result in oxidation of the dihydroquinacridone to quinacridone. If desired, one could use other oxidizing agents which are soluble in the mixture and sufficiently mild to avoid decomposition of the products. The amount of oxidizing agent required for this operation is not at all critical. In general, the optimum amount ranges between about 0.75 part to 1 part per part of dihydroquinacridone but the requirement is largely one of economy rather than of success of operation. Obviously, enough agent must be required to complete the oxidation, and this can be readily calculated.

The concentration of dihydroquinacridone in the oxidation mixture can vary over a wide range. Since the complete solution of all the solid at one time is not necessary for oxidation under the conditions of this invention, one of the functions of the liquid is as a diluent and suspending medium in addition to being a solvent in which the oxidation reaction takes place. Therefore, the only requirement with respect to the amount of liquid is that there be enough liquid present to give an easily stirrable reaction mass. A 10% concentration of dihydroquinacridone in this mixture is a good concentration for practical operations, but it is not a limiting concentration in either direction.

For certain pigmentary uses, it may be desirable to reduce the particle size of the quinacridone products made according to this invention. Beta crystal phase quinacridone may be salt milled in the presence of a crystallizing liquid, such as benzene, toluene, xylene or their halogenated derivatives, without a change in crystal phase. Gamma phase quinacridone may be salt milled in the presence of dimethyl formamide without encountering a phase change. On the other hand, salt milling in the absence of a crystallizing liquid results in a change to the alpha crystal phase. Acid pasting also results in a change to the alpha phase. A preferred procedure for reducing particle size without danger of a change in crystal phase is that of U.S. Patent 2,816,114 to Ehrich and Stratton. In the process of this patent, particle size reduction is accomplished by high energy milling in the presence of a saturated solution of a water-soluble salt and a surface-active agent.

Since it is obvious that many changes and modifications can be made in the above-described details without departing from the nature and spirit of the invention, it is to be understood that the invention is not to be limited to said details except as set forth in the appended claims.

We claim:

1. A method for converting 6,13-dihydroquinacridone to quinacridone having a crystal phase selected from the group consisting of the beta crystal phase and the gamma crystal phase, comprising oxidizing the dihydroquinacridone with a mild, alkali-stable oxidizing agent selected from the group consisting of nitrobenzene-m-sodium sulfonate, air, and sodium polysulfide while partially suspended in and partially dissolved in a mixture of water, a polar, alkali-stable, water-soluble organic solvent and an alkali selected from the group consisting of sodium hydroxide, potassium hydroxide, lithium hydroxide, barium hydroxide, and mixtures thereof, in an amount of about 20–120 parts of said alkali per 100 parts of water and at least 5 parts of said alkali per 100 parts of total liquid used, and the amount of organic solvent is at least as much as the water, and recovering quinacridone from the reaction mixture.

2. A method for converting 6,13-dihydroquinacridone to quinacridone having a crystal phase selected from the group consisting of the beta crystal phase and the gamma crystal phase, comprising oxidizing the dihydroquinacridone with an oxidizing agent selected from the group consisting of nitrobenzene-m-sodium sulfonate, air, and sodium polysulfide while partially suspended in and partially dissolved in a mixture of alkali, water and an organic solvent, said alkali being selected from the group consisting of sodium hydroxide, potassium hydroxide, lithium hydroxide, barium hydroxide, and mixtures thereof, said solvent being selected from the group consisting of methanol, ethanol, n-propanol and isopropanol, isobutanol, glycerol, ethylene glycol, monomethyl ether of ethylene glycol, monoethyl ether of ethylene glycol, ethanolamine, dioxan, ethylene diamine, pyridine, dimethyl sulfoxide, and mixtures thereof the amount of alkali being about 20–120 parts per 100 parts of water and at least 5 parts per 100 parts of total liquid used, and the amount of organic solvent being at least as much as the water, and recovering quinacridone from the reaction mixture.

3. A method for converting 6,13-dihydroquinacridone to beta crystal phase quinacridone comprising refluxing the dihydroquinacridone with an oxidizing agent selected from the group consisting of nitrobenzene-m-sodium sulfonate, air, and sodium polysulfide while partially suspended in and partially dissolved in a mixture of alkali, water, and an alkyl alcohol containing 1–4 carbon atoms, said alkali being selected from the group consisting of sodium hydroxide, potassium hydroxide, lithium hydroxide, barium hydroxide, and mixtures thereof, the amount of alkali being 20–35 parts per 100 parts of water, and the amount of alcohol being 100–200 parts per 100 parts of water, and recovering beta crystal phase quinacridone from the reaction mixture.

4. The process of claim 3 in which the alkali is sodium hydroxide and the alcohol is methanol.

5. The process of claim 3 in which the alkali-water-alcohol mixture is sodium hydroxide, water, and methanol in a ratio of 30:100:130, and the oxidizing agent is nitrobenzene-m-sodium sulfonate.

6. A method for converting 6,13-dihydroquinacridone to beta crystal phase quinacridone comprising refluxing the dihydroquinacridone with an oxidizing agent selected from the group consisting of nitrobenzene-m-sodium sulfonate, air, and sodium polysulfide while partially suspended in and partially dissolved in a mixture of alkali, water, and a polyhydroxy alcohol containing 2–3 carbon atoms, said alkali being selected from the group consisting of sodium hydroxide, potassium hydroxide, lithium hydroxide, barium hydroxide, and mixtures thereof, the amount of alkali being 20–35 parts per 100 parts of water, and the amount of polyhydroxy alcohol being 100–200 parts per 100 parts of water, and recovering beta crystal phase quinacridone from the reaction mixture.

7. A method for converting 6,13-dihydroquinacridone to beta crystal phase quinacridone comprising refluxing the dihydroquinacridone with an oxidizing agent selected from the group consisting of nitrobenzene-m-sodium sulfonate, air, and sodium polysulfide while partially suspended in and partially dissolved in a mixture of alkali, water, and a monoalkyl ether of ethylene glycol having 1–2 carbon atoms in the alkyl radical, said alkali being selected from the group consisting of sodium hydroxide, potassium hydroxide, lithium hydroxide, barium hydroxide, and mixtures thereof, the amount of alkali being 20–35 parts per 100 parts of water, the amount of ether being 100–200 parts per 100 parts of water, and recovering beta crystal phase quinacridone from the reaction mixture.

8. A method for converting 6,13-dihydroquinacridone to beta crystal phase quinacridone comprising refluxing the dihydroquinacridone with an oxidizing agent selected from the group consisting of nitrobenzene-m-sodium sulfonate, air, and sodium polysulfide while partially suspended in and partially dissolved in a mixture of alkali, water, and an alkyl alcohol containing 1–4 carbon atoms, said alkali being a metal hydroxide selected from the group consisting of sodium hydroxide, potassium hydroxide, lithium hydroxide, barium hydroxide, and mixtures thereof, the amount of metal hydroxide being 40–120 parts per 100 parts of water, and the amount of alcohol being at least 200 parts per 100 parts of water, hydrolyzing the metal salt of quinacridone thus formed during said oxidation and recovering beta crystal phase quinacridone from the reaction mixture.

9. The process of claim 8 in which the alkali is sodium hydroxide and the alcohol is ethanol.

10. The process of claim 8 in which the alkali-water-alcohol mixture is sodium hydroxide, water, and ethanol in a ratio of 100:100:240, and the oxidizing agent is nitrobenzene-m-sodium sulfonate.

11. A method for converting 6,13-dihydroquinacridone to beta crystal phase quinacridone comprising refluxing the dihydroquinacridone with an oxidizing agent selected from the group consisting of nitrobenzene-m-sodium sulfonate, air, and sodium polysulfide while partially suspended in and partially dissolved in a mixture of alkali, water, and a polyhydroxy alcohol containing 2–3 carbon atoms, said alkali being a metal hydroxide selected from the group consisting of sodium hydroxide, potassium hydroxide, lithium hydroxide, barium hydroxide, and mixtures thereof, the amount of metal hydroxide, being 40–120 parts per 100 parts of water, and the amount of polyhydroxy alcohol being at least 200 parts per 100 parts of water, hydrolyzing the metal salt of quinacridone thus formed during said oxidation and recovering beta crystal phase quinacridone from the reaction mixture.

12. A method for converting 6,13-dihydroquinacridone to beta crystal phase quinacridone comprising refluxing the dihydroquinacridone with an oxidizing agent selected from the group consisting of nitrobenzene-m-sodium sulfonate, air, and sodium polysulfide while partially suspended in and partially dissolved in a mixture of alkali, water, and a monoalkyl ether of ethylene glycol having 1–2 carbon atoms in the alkyl radical, said alkali being a metal hydroxide selected from the group consisting of sodium hydroxide, potassium hydroxide, lithium hydroxide, barium hydroxide, and mixtures thereof, the amount of metal hydroxide being 40–120 parts per 100 parts of water, and the amount of ether being at least 200 parts per 100 parts of water, hydrolyzing the metal salt of quinacridone thus formed during said oxidation and recovering beta crystal phase quinacridone from the reaction mixture.

13. A method for converting 6,13-dihydroquinacridone to gamma crystal phase quinacridone comprising refluxing the dihydroquinacridone with an oxidizing agent selected from the group consisting of nitrobenzene-m-sodium sulfonate, air, and sodium polysulfide while partially suspended in and partially dissolved in a mixture of alkali, water and a solvent comprising a water-soluble alcohol and pyridine, the solvent being at least half pyridine, while the total solvent is at least equal to the amount of the water, and the amount of alkali is about .2 to .35 part per part of water, and recovering gamma crystal phase quinacridone from the reaction mixture.

14. The process of claim 13 in which the alkali is sodium hydroxide and the ratio of alkali, water, alcohol, and pyridine is 30:100:150:150.

15. A method for converting 6,13-dihydroquinacridone to gamma crystal phase quinacridone comprising refluxing the dihydroquinacridone with an oxidizing agent selected from the group consisting of nitrobenzene-m-sodium sulfonate, air, and sodium polysulfide while partially suspended in and partially dissolved in a mixture of alkali, water, and pyridine, the amount of pyridine being at least equal to the amount of water and the amount of alkali being about .2 to .35 part per part of water, and recovering gamma crystal phase quinacridone from the reaction mixture.

References Cited in the file of this patent

UNITED STATES PATENTS

| | | |
|---|---|---|
| 2,821,529 | Struve | Jan. 28, 1958 |
| 2,821,530 | Struve | Jan. 28, 1958 |
| 2,844,581 | Manger et al. | July 22, 1958 |

UNITED STATES PATENT OFFICE
CERTIFICATION OF CORRECTION

Patent No. 2,969,366                        January 24, 1961

Paul H. Griswold et al.

It is hereby certified that error appears in the above numbered patent requiring correction and that the said Letters Patent should read as corrected below.

Column 1, line 65, for "427" read -- 4.27 --; line 70, for "406" read -- 4.06 --; same line 70 and line 71, for "331", each occurrence, read -- 3.31 --.

Signed and sealed this 6th day of June 1961.

(SEAL)
Attest:

ERNEST W. SWIDER                                DAVID L. LADD

Attesting Officer                                        Commissioner of Patents